United States Patent
Bening

(10) Patent No.: US 7,232,864 B2
(45) Date of Patent: Jun. 19, 2007

(54) COUPLED RADIAL ANIONIC POLYMERS

(76) Inventor: Robert C. Bening, 21807 Cayman Point Dr., Katy, TX (US) 77450

( * ) Notice: Subject to any disclaimer, the term of this patent is extended or adjusted under 35 U.S.C. 154(b) by 385 days.

(21) Appl. No.: 10/965,307

(22) Filed: Oct. 14, 2004

(65) Prior Publication Data

US 2005/0107541 A1 May 19, 2005

(51) Int. Cl.
*C08K 5/54* (2006.01)
(52) U.S. Cl. .................. 525/342; 525/332.9; 525/314; 525/333.3; 525/430; 528/17; 528/25; 528/32; 528/33; 524/261
(58) Field of Classification Search ............... 525/342, 525/332.9, 314, 333, 430, 333.3, 254; 528/17, 528/25, 32, 33; 524/261
See application file for complete search history.

(56) References Cited

U.S. PATENT DOCUMENTS

| RE27,145 E | | 6/1971 | Jones |
|---|---|---|---|
| 3,595,942 A | | 7/1971 | Wald et al. |
| 3,634,549 A | | 1/1972 | Shaw et al. |
| 3,670,054 A | | 6/1972 | De La Mare et al. |
| 3,700,633 A | | 10/1972 | Wald et al. |
| 5,047,492 A | | 9/1991 | Weidner et al. |
| 5,266,648 A | | 11/1993 | Masse |
| 5,484,867 A | * | 1/1996 | Lichtenhan et al. ........... 528/9 |
| 5,552,493 A | | 9/1996 | Spence et al. |
| 5,605,991 A | | 2/1997 | Chamberlain et al. |
| 5,939,576 A | | 8/1999 | Lichtenhan et al. |
| 6,090,902 A | | 7/2000 | Kuo et al. |
| 6,197,889 B1 | * | 3/2001 | Knoll et al. ................. 525/314 |
| 6,252,030 B1 | | 6/2001 | Zank et al. |
| 6,569,932 B2 | | 5/2003 | Hsiao et al. |
| 6,956,087 B2 | * | 10/2005 | Lai et al. ..................... 525/478 |
| 6,972,312 B1 | * | 12/2005 | Lichtenhan et al. .......... 528/14 |
| 2001/0005739 A1 | | 6/2001 | Knoll et al. |
| 2004/0054047 A1 | * | 3/2004 | Lai et al. ..................... 524/268 |

FOREIGN PATENT DOCUMENTS

| CA | 716645 | 8/1965 |
|---|---|---|
| JP | 03-281515 | 12/1991 |
| JP | 03-287617 | 12/1991 |

OTHER PUBLICATIONS

Feher, Frank J. "Polyhedral Oligosilsesquioxanes and Heterosilsesquioxanes" *Department of Chemistry*, University of California; Copyright 1998 Gelest, Inc., p. 43-49.
Hybrid Plastics—Superior Technology for Superior Products "Polyyhederal Oligomeric SilSesquioxane (POSS)" http://www.hybridplastics.com, 2003.

* cited by examiner

*Primary Examiner*—James J. Seidleck
*Assistant Examiner*—Olga Asinovsky
(74) *Attorney, Agent, or Firm*—Michael A. Masse

(57) ABSTRACT

The present invention is a coupled radial anionic polymer comprising a polyhedral oligosilsesquioxane [POSS] of the formula $[R-SiO_{3/2}]_n$. POSS compounds having R=vinyl, glycidyldimethyl silyl, and isobutyl have been found effective in coupling anionic living polymers to yield radial polymers having 2 to 10 arms. Radial polymers of the present invention have been formed using POSS octamers and mixtures of POSS octamers, decamers and dodecamers. The present invention also relates to a process for coupling living anionic polymers with POSS compounds.

21 Claims, No Drawings

COUPLED RADIAL ANIONIC POLYMERS

BACKGROUND OF INVENTION

Technical Field of the Invention

The present invention relates to novel radial anionic polymers which result from coupling reactions with polyhedral oligosilsesquioxane compounds. The radial anionic polymers of this invention are radial homopolymers and radial block copolymers. The present invention also relates to a process for making coupled radial anionic polymers.

Background of Related Art

Polyhedral oligosissesquioxanes (POSS) compounds are three-dimensional siloxy compounds of the formula $[R-SiO_{3/2}]_n$. These compounds can be formed from the condensation of monomers having the formula $[R-SiX_3]$ where X is, for instance, a halogen, alkoxy or hydroxyl group. In the preparation of POSS compounds the organic substituent, R, may be varied by choice of the starting organo-silicon monomer. The number of organo-silicon monomers, n, and thus the size and shape of the resulting POSS can be varied by choice of condensation conditions.

When the organo-substituent group is functional to chemical reactions, the three-dimensional POSS compounds have been found to be useful in cross-linking reactions with siloxane polymers as taught in U.S. Pat. No. 5,047,492 to make non-soluble, solid materials. The multifunctionality of the POSS compound renders it effective as a crosslinking agent. POSS compounds having pendant groups reactive under free-radical, anionic, or cationic polymerization conditions have been found useful in the preparation of graft polymers, homopolymers, copolymers and POSS-end-capped polymers as taught in U.S. Pat. No. 5,484,867. Under appropriate conditions, POSS compounds having Si—H bonds have been used as monomers in condensation polymerizations taught in U.S. Pat. No. 6,252,030 to make electrically insulating films.

POSS compounds have also been employed as physical, as opposed to chemical, crosslinkers to enhance the physical properties of polyolefins as taught in U.S. Pat. No. 6,569,932. In this way, the POSS compounds were incorporated into polymers to yield blends of reduced flammability and increased heat distortion temperature while avoiding extensive crosslinking reactions which lead to gelation.

Various approaches have been used to produce coupled polymers in living anionic syntheses. Highly purified glycidyl epoxy reagents have been taught in Japanese Patent 03-281515 as coupling agents to produce linear anionic polymers. Star shaped anionic polymers have been made using divinyl aromatic compounds as taught in Canadian patent 716,645. However, the coupling achieved with the divinyl aromatic compounds is statistical in nature and produces a large arm number distribution. As a result, the star polymers can have fractions which have very high molecular weight and cause a high viscosity of the polymer in solution or melt. The process also results in a "gel particle"-like core structure that can represent a significant volume fraction of the final polymer. This can have significant consequences for the rheology and physical properties of the product, particularly when the arms are relatively short.

More controlled coupling schemes have been used to make radial anionic polymers using silicon-based coupling agents as taught in U.S. Pat. No. 5,266,648. These multifuntional coupling agents are capable of producing radial polymers having 2 to 12 arms, but reagents capable of producing polymers with more than 6 arms are less readily available. Coupling reactions using these reagents result in formation of a silicon-carbon bond of low polarity.

There remains a need for an effective and readily available coupling agent capable of making radial anionic polymers having a controlled and relatively large number of arms, coupled through a spatially compact, geometrically well-defined molecular structure. In addition, there is interest in coupling agents for radial polymers which could be substrates for post-coupling reactions. Most of the coupling reactions of the present invention have the additional advantage of introducing polar, reactive, hydroxyl groups at the coupling site. The present invention utilizes the POSS compounds to address these needs.

SUMMARY OF INVENTION

The present invention is a radial polymer having at least two arms wherein each arm is comprised of at least one anioncially polymerizable monomer and the arms are joined at a polyhedral oligosilsesquioxane coupling agent of the formula $[R-SiO_{3/2}]_n$ wherein n ranges from 6 to 12, and R is an organo-substituent. The radial polymer of the present invention has arms comprising, but not limited to, homopolymers of monovinyl arenes or conjugated dienes, and block copolymers of conjugated dienes and/or monovinyl arenes.

The present invention also relates to a process for making a radial polymer having at least two arms, wherein each arm comprises at least one anionically polymerizable monomer and a polyhedral oligosilsesquioxane coupling agent of the formula $[R-SiO_{3/2}]_n$ wherein n ranges from 6 to 12, and R is an organo-substituent comprising: a) initiating polymerization of a first anionically polymerizable monomer in an inert hydrocarbon solvent using an alkali metal initiator; b) optionally adding a polar polymerization modifier; c) optionally adding a second anionically polymerizable monomer; d) adding a sufficient amount of coupling agent to produce a coupled polymer; e) optionally hydrogenating the coupled polymer using a Group VIII transition metal based catalyst; and f) recovering the coupled polymer.

The polymers of the present invention are radial in structure and have a well defined number of arms, coupled to a well-defined molecular structure. Further, as a result of the novel use of the POSS compounds as a coupling agent, the radial polymers of the present invention may possess reactive functional groups at the coupling site.

DETAILED DESCRIPTION

The present invention offers radial anionic polymers and processes for making them. Polymeric arms are synthesized by living anionic polymerization techniques and then subsequently coupled using POSS compounds. Surprisingly, the POSS compounds are able to act as coupling agents of living anionic polymers even when the organo-substituent groups of the POSS compounds are considered to be unreactive toward carbanions.

For the purposes of the present invention, radial polymers are considered to be constructs involving two or more arms that are linked at and radiate from a coupling molecule or agent. It is important to note that linear coupled polymers are one case of a radial polymer where the number of arms is two. Radial polymers are distinguished from star polymers which also include a multitude of arms but are coupled at a spatially diffuse core. Divinyl benzene (DVB) coupling produces such spatially diffuse core star polymers since DVB can both polymerize and react as a coupling agent. Radial polymers are also to be distinguished from branched, grafted, or comb polymers which possess arm-like structures attached intermittently along a linear polymer backbone.

The polymeric arms of the radial anionic polymers are composed of anionically polymerizable monomers. These monomers can be selected from the general class of anionically polymerizable monomers. In particular, the conjugated diene monomers for use herein are 1,3-butadiene, commonly referred to as butadiene, and substituted butadiene such as isoprene, piperylene, 2,3-dimethyl-1,3-butadiene, and 1-phenyl-1,3-butadiene, or mixtures thereof. Most preferred in the present invention are butadiene and isoprene. The monovinyl arene monomers for use herein are styrene, alpha-methyl styrene, para-methyl styrene, vinyl toluene, vinylnaphthalene and para-butyl styrene. In the present invention the most preferred monovinyl arene monomer is styrene.

When the polymer arms are homopolymers or consist of homopolymer blocks then these homopolymer segments (arms or blocks) will be composed of predominantly a single anionically polymerizable monomer. The homopolymer segments are said to be predominantly composed of a single monomer to account for the case when a second monomer is present, either incidentally or intentionally, at a less than 5 mol % level basis the total amount of monomer making up the segment.

The living anionic polymerizations are generally conducted in inert, aprotic hydrocarbon solvents. Typical solvents are cyclic hydrocarbons or linear or branched alkanes. Solvents of particular use are cyclohexane, cyclopentane, isopentane, hexane, heptane, octane, and the like. Mixtures of these solvents are also suitable.

The living anionic polymerization is initiated using a soluble alkali metal compound. Particularly useful initiators are lithium compounds of the formula R'Li where R' is an aliphatic, cycloaliphatic, aromatic or alkl substituted aromatic hydrocarbon having from 1 to about 20 carbon atoms. Organolithium compounds are preferred initiators because of their high temperature stability. Preferred initiators for this invention are butyl lithium compounds such as nBuLi, sBuLi and tBuLi. Most preferred is sBuLi. The ratio of initiator to monomer is chosen to yield the desired molecular weight of the polymeric arms.

Polar polymerization modifiers can be used to modify the vinyl content of dienes, sometimes referred to as microstructure, during polymerization and to enhance coupling reactions. The term "vinyl content" refers to the fact that a conjugated diene is polymerized via 1,2-addition in the case of butadiene or 3,4-addition in the case of isoprene. In the case of 1,2-butadiene addition an unsubstituted vinyl group results. In the case of 3,4-isoprene addition a methyl-substituted vinyl group results. In both cases the pendant group is referred to as a vinyl group. In the present invention the vinyl content of the polymers can range from 5 to 100%. When the diene polymers are to be subsequently hydrogenated the vinyl content of butadiene polymers or blocks is preferably greater than 20% and most preferably in the range of 35 to 80%. This reduces the tendency of the hydrogenated polybutadiene segments to crystallize. High vinyl contents, both hydrogenated and non-hydrogenated, lead to better compatibility with polyolefins such as polyethylene, polypropylene and common copolymers based on ethylene and/or propylene. When a high degree of compatibility is desired with polyolefins the vinyl content is preferably greater than 50% and most preferably in the range of 60 to 95%.

Polar modifiers are typically chosen from non-chelating ethers such as diethyl ether (DEE), or chelating ethers such as 1,2-diethoxy-propane (DEP), and ortho-dimethoxy-benzene (ODMB). Typically, DEE is used at levels between 0.5% wt and 10 wt % basis the total amount of solvent and modifier. For the purpose of the present invention the preferred amount of DEE is 2% wt to 8% and most preferably 4 to 7%. The highly effective modifiers, such as DEP and ODMB, are generally used at 50 ppm to 10,000 ppm levels. In the present invention the preferred range of DEP or ODMB is 100 ppm to 1200 ppm and most preferably 200 ppm to 1000 ppm. Mixtures of modifiers can also be used.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Reissue 27,145, the dislcosures of which are herein incorporated by reference. These methods operate to hydrogenate polymers containing aromatic or ethylenic unsaturation and are based upon operation of a suitable catalyst. Such catalyst, or catalyst precursor, preferably comprises a Group VIII transition metal such as nickel or cobalt which is combined with a sutable reducing agent such as an aluminum alkyl or hydride of a metal selected from the Groups I-A, II-A, and III-B of the Period Table of Elements, particularly lithium, magnesium, or aluminum. This preparation can be accomplished in a suitable solvent or diluent at a temparature from about 20° C. to about 80° C. Other catalysts that are useful include titanium based catalyst systems.

Hydrogenation can be carried out under such conditions that at least about 90% of the conjugated diene double bonds have been reduced, and between 0% and 10% of the arene double bonds have been reduced when both dienes and monovinyl arenes are present in the radial polymer. Preferred ranges are at least about 95% of the conjugated diene double bonds reduced, and more preferably about 98% of the conjugated diene double bonds are reduced, when conjugated dienes are present in the radial polymer. Alternately, it is possible to hydrogenate the polymer such that the aromatic unsaturation of the monovinyl arene, when present in the radial polymer, is also reduced beyond the 10% level mentioned above. Such exhaustive hydrogenation is usually achieved at higher temperatures. In that case, the double bonds of both the conjugated diene and monovinyl arene may be reduced by 90% or more when both conjugataed diene and monovinyl arenes are present in the radial polymer.

Once the hydrogenation is complete, it is preferable to extract the catalyst by stirring with the polymer soution a relatively large amount of aqueous acid, preferably 20 to 30% wt, at a volume ratio of about 0.5 parts aqueous acid to 1 part polymer solution. Suitable acids include phosphoric acid, sulfuric acid, and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

In one preferred embodiment of the present invention the polymeric arms are composed of homopolydiene. The molecular weight of these arms is in the range from about 1000 to about 100,000 daltons. The living anionic polymerization used generally produces polymers of narrow molecular weight distribution, typically in the range from about 1.01 to about 1.2. In the present invention the preferred molecular weight distribution is in the range from about 1.01 to about 1.1. The radial polymers formed by the coupling of homopolydiene arms can proceed to make symmetric radial polymers such that each arm is similar with regard to composition, vinyl content, and molecular weight. While the arms of this embodiment will be homopolymers of a single anioncially polymerizable diene, a mixture of homopolydiene arms can also be coupled to form a mixed radial polymer. The radial polymers resulting from the coupling of mixtures of different arms will be asymmetric with regard to composition, vinyl content, and/or molecular weight. Such mixtures may be composed of a mixture of arms of similar chemical composition and vinyl content but different molecular weights. One example of such a mixture would be composed of arms of polybutadiene of molecular weight $M_1$ and of molecular weight $M_2$ where $M_1$ and $M_2$ are not equal. Such mixtures may also be composed of a mixture of arms of different composition. One example of such a mixture would be composed of arms of homopolybutadiene and homopolyisoprene. Such mixtures may also be mixtures of arms of different vinyl content and/or molecular weight. One example of such a mixture would be composed of arms of polybutadiene of vinyl content $V_1$ and polybutadiene of vinyl content $V_2$ where $V_1$ is not equal to $V_2$. Such mixtures may also further be mixtures in which both the composition, vinyl content and the molecular weight vary. One example of such a mixture would be composed of homopolybutadiene arms of molecular weight $M_1$ and homopolyisoprene arms of molecular weight $M_2$ where $M_1$ is not equal to $M_2$.

In another preferred embodiement of the present invention the polymeric arms are composed of homopoly (monovinyl arene). The molecular weight of these arms is in the range from about 1000 to about 100,000 daltons. As with the embodiment containing homopolydienes, this embodiment may analogously be represented by mixtures of arms of different molecular weight, different composition of the monovinyl arene, or both different molecular weights and compositions.

In another preferred embodiment of the present invention the polymeric arms are composed of block copolymers where the blocks have different diene compositions and/or different vinyl contents. The molecular weight of each of the blocks in these arms are independently in the range from about 1000 to about 100,000 daltons. One example of this embodiment would be a symmetric coupled block copolymer composed of arms of a first hydrogenated polybutadiene block of vinyl content $V_1$ and a second hydrogenated polybutadiene block of of vinyl content $V_2$ where $V_1$ and $V_2$ were not equal. In this example, the two blocks will have different characteristics with regard to compatibility with polyolefins and/or crystallization behavior. Another example of this embodiment would be a symmetric coupled block copolymer composed of arms of a first polybutadiene block and a second polyisoprene block. As with the other preferred embodiments, asymmetric radial polymers are also representative of this embodiment.

In another preferred embodiment of the present invention the polymeric arms are composed of block copolymers where at least one block is composed of a monovinyl arene and at least one block is composed of a conjugated diene. The molecular weight of each of the blocks in these arms are independently in the range from about 1000 to about 100,000 daltons. One example of this embodiment would be a symmetric coupled radial polymer composed of a first block of polystyrene and a second block of butadiene. A second example of this embodiment would be a symmetric coupled radial polymer composed of a first block of polybutadiene, a second block of polystyrene, and a third block of polybutadiene separated from the first block of polybutadiene by the second block of polystyrene. As with the other preferred embodiments, asymmetric radial polymers are also representative of this embodiment.

The POSS compounds useful in the present invention as coupling agents for living anionic polymers are represented by the formula $[R-SiO_{3/2}]_n$ where R is an organo-substituent and n is the number of repeat units in the three-dimensional structure. The organo-substituents are selected from olefinic hydrocarbons, aliphatic hydrocarbons, aromatic hydrocarbons, organo halides and organo silyl glycidyl epoxies. For instance, R may be alkyl, cycloalkyl, alkene, phenyl, organo glycidyl ether epoxies, organo-silanes, and organo-substituted variants of the same. Further specific examples of the organo-substituents are glycidyl isooctyl, glycidyl phenyl, cyclohexyl oxide dimethyl silyl, glycidyl dimethyl silyl, cyclohexyl, cyclopentyl, butyl, isobutyl, phenyl, octyl, isooctyl, methyl, ethyl, propyl, isopropyl, vinyl (or ethenyl), vinyl phenyl methyl silyl, vinyl dimethyl silyl, chloro methyl phenyl, chloro propyl, bromo propyl, chloromethyl dimethyl silyl, and the like. The substituents in a single POSS molecule may be all identical or they may result from a mixture of the organo-substituents listed above. The number of repeat units in the POSS structure useful in the present invention is in the range from 6 to 12. The coupling agent can be a POSS isomer represented by a single n value or may be a mixture of isomers of different n value. Octamers (n=8) and mixtures of isomers containing the octamer are preferred in the present invention. The POSS compounds most preferred in the present invention are vinyl POSS where R is represented by the formula $[-CH=CH_2]$ and the POSS is a mixture of isomers, octaisobutyl POSS, and octaglycidyl dimethly silyl POSS where R is represented by the formula $[-O-Si(CH_3)_2-(CH_2)_2-CH(O)CH_2]$.

The POSS coupling agent may be used in a pure state or may be diluted in an inert aprotic solvent for ease of handling and for accuracy of addition. The coupling agent will be used in an amount sufficient to react with two or more living chain ends to produce a radial coupled polymer. Thus, the molar ratio of Li (representing the reactive living polymer end) to coupling agent molecule will be greater than 1.0. It has been found that Li to POSS ratios in the range from 1 up to about 14 have been useful in producing the coupled polymers of this invention. In one preferred embodiment of the present invention the ratio of Li to POSS repeat unit will be about 1.0. In the case of a POSS octamer then this means the ratio of Li to POSS molecule will be about 8.0. In another preferred embodiment the ratio of Li to POSS repeat unit will be less than 1.0 and the ratio of Li to POSS molecule will be greater than 1.0. When the POSS is an octamer this means the Li to POSS molecule ratio ranges from greater than 1.0 to less than 8.0. In this case there can be residual reactive sites left on the POSS molecule after the coupling reaction. These reactive sites can be used for reactions with other living chain ends or with other functionalizing molecules. The preferred range of molar ratio of Li to POSS coupling agent is from about 1 to about 8.

The entire amount of POSS coupling agent may be added at the beginning of the coupling reaction, in several aliquots during the coupling reaction, in a continuous addition scheme beginning at the onset of coupling and finishing after a definite period of time before coupling is complete, or by a combination of such methods. In one preferred embodiment the entire amount of POSS coupling agent is added to the living polymer in a rapid, batch fashion at the beginning of coupling. The living chain ends immediatly contacted experience a relatively high concentration of coupling agent. In another preferred embodiment the POSS coupling agent is added slowly via a programmed addition scheme to the living polymer solution. When the addition is slow and the POSS has been diluted, the living chain ends experience a relatively low concentration of coupling agent. Generally, the coupling reaction is allowed to proceed from 10 to 300 minutes at a temperature in the range of from about 50° C. to about 110° C. The preferred temperature is in the range from about 60° C. to about 100° C.

The effectiveness of coupling is an important consideration in the present invention. This effectiveness is referred to as coupling efficiency. The coupling efficiency is expressed normally and herein as the percentage of living anionic polymeric arms that are incorporated into a coupled structure having at least two arms basis the total number of arms prior to coupling. Coupling efficiencies in the range of 1% to 100% are of interest in the present invention. While the goal of the reaction of living anionically polymerized arms with POSS molecules is the production of a coupled radial polymer, the presence of uncoupled arms does present advantages is some respects. For instance, the presence of uncoupled arms will lead to a lower overall polymer viscosity. In addition, uncoupled arms are known to improve wetting in adhesive formulations. Thus, the ability to chose or control the coupling efficiency allows production of coupled polymers with a range of physical characteristics and for a range of applications. In the present invention low coupling efficiency generally means less than 40%. Intermediate coupling efficiency means 40% to less than 80%. High coupling efficiency means 80% or greater. Expressed alternately, the preferred number of coupled arms is 2 to 10. More preferred is the range of 4 to 10 coupled arms.

For the purposes of the present invention, the POSS molecule is considered to be composed of an internal Si—O—Si POSS cage structure onto which organo substituents, R, are attached. This forms the molecular coupling site of the polymer. Without being bound by theory, we wish to suggest that the dominant coupling chemistry depends upon the reactivity of the functional groups present as the R substituents and the ratio of these functional groups to living polymer anions. When these substituents possess highly reactive functional groups, such as glycidyl ethers, and the ratio of these groups to living polymer arms is less than about 1.0, coupling takes place primarily by addition to these functional groups, with very little reaction of the Si—O—Si bonds that form the POSS cage structure. However, in the presence of excess living polymer arms, and when these substituents lack highly reactive functional groups, chains add directly to the Si—O—Si POSS cage structure. Surprisingly, this direct addition to the cage structure has been found to occur in the present invention when the organo-substituents are non-functional groups such as isobutyl groups to such an extent as to lead to useful levels of coupling efficiency.

In the specific case where the substituents are vinyl groups, represented by the formula [—CH=CH$_2$], most of the coupling occurs by reaction with the Si—O—Si POSS cage structure, rather than by addition to the vinyl group. The vinyl group does appear to activate the POSS molecule towards addition of the living polymer to the Si—O—Si POSS cage structure. As a result, high coupling efficiencies can be achieved. However, when the coupling reaction is carried out with a ratio of Li to POSS repeat unit near 1.0, The addition of more than one polymer arm to a silicon atom is less favored and so the arm distribution for a POSS molecule remains narrow. In that case the average arm number is close to the number of repeat units (n) in a POSS molecule.

While the living polymer may react at the Si—O—Si bonds of the POSS cage structure, this reaction occurs in such a way as to maintain the connectivity of the Si—O—Si cage structure. If this were not the case, then the reaction of the living polymer with the POSS reagent would not lead to coupling of polymer arms into a radial polymer structure but rather disruption of the POSS and uncoupled arms.

Importantly, the addition of a living polymer end to the Si—O—Si POSS cage structure is expected to yield a polar Si—OH group. In addition to coupling, hydroxyl groups are also formed upon reaction of the living polymer arm with glycidyl epoxy substituent.

EXAMPLES

Materials

The polyhedral oligosilsesquioxane (POSS) coupling agents used for these examples were octaisobutyl POSS (MS0825 from Hybrid Plastics), octaglycidyldimethylsilyl POSS (EP0435 from Hybrid Plastics), and vinyl POSS (OL1170 from Hybrid Plastics) which was a mixture of octamers (n=8), decamers (n=10) and dodecamers (n=12). The POSS coupling agents were used as received without further purification. For ease and accuracy of addition, the coupling agents were diluted in dried cyclohexane. The octabutyl POSS and the vinyl POSS were dissolved to make a 25% wt solution. The octaglycidyldimethylsilyl POSS was dissolved to make a 50% wt solution.

The monomers and solvents were treated to remove protic impurities before use. DEP was dissolved in dry cyclohexane and stored on activated 4A molecular sieves prior to use. sBuLi initiator was obtained as a nominally 12% wt solution and was used as received or diluted to approximately 5% wt in dried cyclohexane.

Synthetic Procedures

The anionic polymerization of the living polymers proceeded according to standard protocol. Two different synthetic procedures were used to conduct the coupling step of the present invention. The first procedure involved rapid addition of the coupling agent to the living polymer in a batch fashion. The second procedure involved slow programmed addition of the coupling agent at an approximately constant rate to the living polymer.

In the case of rapid coupling agent addition, a 1L stainless steel autoclave was used for the polymerization and coupling reactions. Monomer was dissolved in dry cyclohexane at 30° C. in a sufficient amount to give an approximate 15% wt solution. If a polar modifier was used, it was added before the initiation of polymerization. DEE was used at 6 wt % basis the total solvent amount. DEP was used at 800 ppm basis the total solvent amount. An amount of intitiator sufficient to achieve a target molecular weight of 5000 daltons was added. The exothermic heat rise due to polymerization was controlled by water cooling. Progress of the polymerization reaction was monitored by an in-situ IR probe. Once the IR measurements indicated complete polymerization of monomer and the solution of living polymer had reached the intitial temperature for coupling, the coupling agent was added rapidly in a single batch. The coupling reaction was monitored using an in-situ UV-vis probe. The coupling reaction was allowed to proceed at the initial temperature for 60 minutes. If the UV-vis measurements indicated unreacted living polymer at the end of this period, the temperature was increased by 110° C. and the reaction allowed to proceed for an additional 30 minutes. This procedure was repeated until complete coupling was indicated or the coupling had proceded at 100° C. for 30 minutes. At the completion of the coupling reaction the coupled living polymer was terminated by addition of 1 mole of isopropanol per mole of sBuLi.

In the case of slow, programmed addition of coupling agent, a 2L glass reactor was used. Monomer was dissolved in dry cyclohexane at 40° C. in a sufficient amount to make an approximate 10% wt solution. If a polar modifier was used, it was added before the initiation of polymerization. Diethyl ether (DEE) was used at 6 wt % basis the total solvent amount. DEP was used at 800 ppm basis the total solvent amount. An amount of initiator sufficient to achieve a target molecular weight of 2500 daltons was added. Once the polymerization exotherm had peaked, the cooling bath temperature was set to the target initial coupling temperature. The coupling addition was begun once the reaction mixture reached the target coupling temperature and at least 8 half-lives had elapsed under polymerization conditions. The addition of coupling agent was conducted using a Harvard Apparatus syringe pump set at a constant delivery rate. The addition of coupling agent proceded over a 30 minute period. The coupling reaction was allowed to procede for an additional 30 minutes after the full charge of coupling agent had been delivered. The coupled living polymer was then terminated by addition of 1 mole of isopropanol per mole of sBuLi.

Analytical Measurements

Gel permeation chromatography (GPC) with refractive index (RI), ultraviolet absorption (UV) and multiple angle laser light scattering (MALLS) detectors were used to measure the molecular weight of the polymers before and after coupling. The coupling efficiency (expressed as a percentage) was calculated as the ratio of coupled peak area to total eluted area using the GPC chromatograms. The number of arms per coupled polymer was calculated using the absolute molecular weight results provided by the MALLS detector.

Example 1

1,3-butadiene was polymerized and then coupled using octaisobutyl POSS(R is isobutyl, n=8). Various ratios of living chain end (or Li) to coupling agent, polar modifer levels, and coupling agent addition protocols were employed. The synthetic details and results are listed in Table A.

TABLE A

| polymer | modifier | coupling addition | Li:POSS | no arms predicated | inititial coupling T (° C.) | final coupling T (° C.) | final coupling efficiency (%) | apparent no arms at 15 min. | apparent no arms final |
|---|---|---|---|---|---|---|---|---|---|
| A | none | rapid | 4.55 | 5 | 65 | 65 | 46 | 2 | 2 |
| B | none | slow | 5.88 | 6 | 65 | 65 | 23 | 2 | 2 |
| C | DEE | slow | 7.69 | 8 | 60 | 90 | 68 | 2 | 2 |

The results of TABLE A show that the octaisobutyl POSS coupling agent was effective at producing low to intermediate levels of coupled radial polymer having two arms. Surprisingly, the coupling reaction proceeded even though the isobutyl organo substituents are not reactive toward the living polymer arms. The limited amount of coupling achieved with the octaisobutyl POSS compound suggests reaction at the Si—O—Si POSS cage structure without disruption of the coupling molecule structure. Low coupling efficiencies were achieved when the coupling agent was added in the slow coupling protocol and in the absence of a polar modifier. Addition of DEE polar modifier in the slow coupling protocol or use of rapid coupling agent addition resulted in intermediate levels of coupling efficiency.

Example 2

1,3-butadiene (Bd) or isoprene (Ip) was polymerized and then coupled using vinyl POSS. Various ratios of living chain end (or Li) to coupling agent, polar modifer levels, and coupling agent addition protocols were employed. The synthetic details and results are listed in Table B.

TABLE B

| polymer | monomer | modifier | coupling addition | Li:POSS | no. arms predicted | initial coupling T (° C.) | final coupling T (° C.) | final coupling efficiency (%) | apparent no. arms final |
|---|---|---|---|---|---|---|---|---|---|
| D | Bd | DEP | rapid | 14.29 | 14 | 70 | 100 | 91 | 8 |
| E | Bd | DEP | rapid | 7.69 | 8 | 70 | 100 | 91 | 8 |

TABLE B-continued

| polymer | monomer | modifier | coupling addition | Li:POSS | no. arms predicted | initial coupling T (° C.) | final coupling T (° C.) | final coupling efficiency (%) | apparent no. arms final |
|---|---|---|---|---|---|---|---|---|---|
| F | Bd | DEP | rapid | 4.76 | 5 | 70 | 100 | 91 | 8 |
| G | Bd | none | rapid | 8.33 | 8 | 70 | 100 | 91 | 4 |
| H | Ip | none | rapid | 7.69 | 8 | 70 | 100 | 97 | 7 |
| I | Bd | none | slow | 5.88 | 6 | 65 | 65 | 95 | 10 |
| J | Bd | DEE | rapid | 7.69 | 7 | 60 | 70 | 86 | 5 |

The results of TABLE B show that the vinyl POSS coupling agent was effective at producing high levels of coupled radial polymer having 4 to 10 arms. Under all conditions of monomer type, Li:POSS ratio, coupling agent addition protocol, and modifier level, coupling efficiencies of 86% or greater were achieved.

Example 3

1,3-butadiene was polymerized and then coupled using octaglycidyldimethylsilyl POSS. Various ratios of living chain end (or Li) to coupling agent, polar modifer levels, and coupling agent addition protocols were employed. The synthetic details and results are listed in Table C.

TABLE C

| polymer | modifier | coupling addition | Li:POSS | no. arms predicted | initial coupling T (° C.) | final coupling T (° C.) | final coupling efficiency (%) | apparent no.arms final |
|---|---|---|---|---|---|---|---|---|
| K | none | slow | 3.45 | 3.5 | 65 | 65 | 81 | 4.6 |
| L | DEE | rapid | 6.25 | 6 | 60 | 60 | 67 | 3.2 |

The results of TABLE C show that the octaglycidyldimethylsilyl POSS coupling agent was effective at producing intermediate to high levels of coupled radial polymer having 3 or more arms. Intermediate coupling efficiency was achieved when the coupling agent was added in the rapid coupling protocol where the DEE polar modifier was used. Use of the slow coupling protocol, in the absence of a polar modifier, resulted in a high coupling efficiency with this coupling agent.

Example 4

Prophetic

A selectively hydrogenated styrene-butadiene block copolymer is prepared according to the present invention beginning with dissolution of styrene monomer in dried cyclohexane containing 6% wt DEE. A sufficient amount of sBuLi is added to polymerize a polystyrene block having a molecular weight of 7500 daltons. The polymerization reaction is allowed to proceed isothermally at 50° C. for 30 minutes. Butadiene monomer is then added to the solution of the living polystyrene in an amount sufficient to polymerize a block having a molecular weight of 30,000 daltons. The total amount of monomer added results in a 10% wt solution of polymer in solvent. The polymerization reaction is then continued isothermally at 50° C. for 2 hours. An octavinyl POSS coupling agent is added in a rapid, batch fashion and the molar ratio of Li to POSS molecule is 8.1. The temperature is increased to 75° C. and the coupling reaction is allowed to proceed for 30 minutes. One mole of isopropanol is then added for every mole of Li added at initiation. The terminated polymer is then transferred to a high pressure autoclave and 50 ppm of a nickel octoate/triethyl aluminum hydrogenation catalyst is added. Hydrogen gas is then introduced at 300 psig and the hydrogenation reaction is allowed to proceed for 2 hours adiabatically. The solution is then washed with dilute aqueous phosphoric acid to remove the hydrogenation catalyst. The organic layer containing the dissolved polymer is removed. The coupled radial polymer is then recovered by hot water coagulation of the polymer followed by air oven drying of the polymer.

Example 5

Prophetic

A hydrogenated isoprene block copolymer is prepared according to the present invention beginning with dissolution of isoprene monomer in dried cyclohexane to make a 10 wt % solution. A sufficient amount of sBuLi is added to polymerize a polyisoprene arm having a molecular weight of 50,000 daltons. The polymerization reaction is allowed to proceed isothermally at 50° C. for 3 hours. An octaglycidyl dimethyl silyl POSS coupling agent is added in a rapid, batch fashion and the molar ratio of Li to POSS molecule is 6.1. The temperature is increased to 75° C. and the coupling reaction is allowed to proceed for 30 minutes. One mole of isopropanol is then added for every mole of Li added at initiation. The terminated polymer is then transferred to a high pressure autoclave and 50 ppm of a nickel octoate/ triethyl aluminum hydrogenation catalyst is added. Hydrogen gas is then introduced at 300 psig and the hydrogenation reaction is allowed to proceed for 2 hours adiabatically. The solution is then washed with dilute aqueous phosphoric acid to remove the hydrogenation catalyst. The organic layer containing the dissolved polymer is removed. The coupled radial polymer is then recovered by hot water coagulation of the polymer followed by air oven drying of the polymer.

The actual examples 1, 2, and 3 shown herein demonstrate the coupling of relatively low molecular weight living conjugated diene polymers. For the purpose of more fully describing the invention the prophetic examples 4 and 5 have been included. It will be understood by the skilled artisan that these POSS coupling agents are not limited to use with low molecular weight polymers but will be similarly effective in coupling high molecular weight living conjugated diene polymers and other high molecular weight polymers of anionically polymerizable monomers. In addition, it will be understood that block copolymers consisting of separate and distinct blocks of anionically polymerized monomers, tapered block copolymers of the same, controlled distribution block copolymers of the same, and random copolymers of the same would be similarly coupled using the POSS coupling agents.

What is claimed:

1. A radial polymer having at least two arms wherein each arm is comprised of at least one anioncially polymerizable monomer chosen from the group consisting of monovinyl arenes and conjugated dienes and the arms are joined at a polyhedral oligosilsesquioxane coupling agent of the formula $[R-SiO_{3/2}]_n$ wherein n ranges from 6 to 12, and R is an organo substituent.

2. The radial polymer of claim 1 wherein R is selected from the group consisting of olefinic hydrocarbons, aliphatic hydrocarbons, aromatic hydrocarbons, organo halides and organo silyl glycidyl epoxies.

3. The radial polymer of claim 2 wherein R is a vinyl group of the formula $[-CH=CH_2]$ and the coupling agent is a mixture of species having n=8, 10 and 12.

4. The radial polymer of claim 2 wherein R is an organo silyl glycidyl epoxy of the formula $[-O-Si(CH_3)_2-(CH_2)_2-O-CH_2-CH(O)CH_2]$ and n=8.

5. The radial polymer of claim 2 wherein the number of coupled arms is 2 to 10.

6. The radial polymer of claim 2 wherein R is an isobutyl group and n=8.

7. The radial polymer of claim 1 wherein the polymerizable monomer is predominantly butadiene or isoprene.

8. The radial polymer of claim 1 wherein the polymerizable monomer is predominantly styrene.

9. The radial polymer of claim 1 having at least one polymeric block predominantly composed of styrene and at least one polymeric block predominantly composed of a conjugated diene.

10. The radial polymer of claim 7 wherein the polymer is hydrogenated.

11. The radial polymer of claim 9 wherein the polymeric blocks predominantly composed of a conjugated diene are selectively hydrogenated.

12. A process for making a radial polymer having at least two arms, wherein each arm comprises at least one anionically polymerizable monomer, and a polyhedral oligosilsesquioxane coupling agent of the formula $[R-SiO_{3/2}]_n$ wherein n ranges from 6 to 12, and R is an organo substituent comprising:
   a) initiating polymerization of a first anionically polymerizable monomer in an inert hydrocarbon solvent using an alkali metal initiator;
   b) optionally adding a polar polymerization modifier;
   c) optionally adding a second anionically polymerizable monomer;
   d) adding a sufficient amount of coupling agent to produce a coupled polymer;
   e) optionally hydrogenating the coupled polymer using a Group VIII transition metal based catalyst; and
   f) recovering the coupled polymer.

13. The process of claim 12 wherein the polar modifier is selected from the group consisting of diethyl ether, ortho dimethoxy benzene, and 1,2-diethoxy propane.

14. The process of claim 12 wherein the organo lithium initiator is selected from the group consisting of nBuLi, sBuLi and tBuLi.

15. The process of claim 12 wherein the Group VIII transition metal is selected from the group consisting of nickel or cobalt.

16. The process of claim 12 wherein the first anionically polymerizable monomer is selected from the group consisting of styrene, butadiene and isoprene.

17. The process of claim 12 wherein the first anionically polymerizable monomer is styrene and the second anionically polymerizable monomer is a conjugated diene.

18. The process of claim 12 wherein the entire amount of coupling agent is added at the beginning of the coupling reaction of step d).

19. The process of claim 12 wherein the coupling agent is continuously added over a 30 minute period beginning at the onset of the coupling reaction of step d).

20. The process of claim 12 wherein the amount of coupling agent is such that the molar ratio of Li to coupling agent is in the range of from about 1 to about 14.

21. The process of claim 12 wherein the amount of coupling agent is such that the molar ratio of Li to coupling agent is in the range of from about 1 to about 8.

* * * * *